US007684413B2

(12) United States Patent
Skerritt

(10) Patent No.: US 7,684,413 B2
(45) Date of Patent: Mar. 23, 2010

(54) SYSTEM AND METHOD FOR RATE AGILE ADAPTIVE CLOCKING IN A PACKET-BASED NETWORK

(75) Inventor: Michael Skerritt, Oak Hill, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 807 days.

(21) Appl. No.: 10/530,673

(22) PCT Filed: Oct. 9, 2003

(86) PCT No.: PCT/US03/32157

§ 371 (c)(1),
(2), (4) Date: Dec. 27, 2005

(87) PCT Pub. No.: WO2004/034619

PCT Pub. Date: Apr. 22, 2004

(65) Prior Publication Data

US 2006/0146884 A1    Jul. 6, 2006

Related U.S. Application Data

(60) Provisional application No. 60/416,925, filed on Oct. 9, 2002.

(51) Int. Cl.
*H04L 12/28* (2006.01)

(52) U.S. Cl. .................. 370/395.62; 370/395; 370/299; 370/349; 370/468; 375/354; 375/355; 375/356; 455/51.2; 455/67.6

(58) Field of Classification Search .................. 370/60, 370/86, 94, 286, 289, 299, 349, 350, 468, 370/503; 375/354, 355, 356; 455/51.2, 67.6
See application file for complete search history.

(56) References Cited

U.S. PATENT DOCUMENTS

| 4,142,069 | A  |   | 2/1979  | Stover .......................... 179/15 |
|-----------|----|---|---------|------------------------------------------|
| 4,845,709 | A  | * | 7/1989  | Matsumoto et al. ......... 370/452        |
| 5,025,457 | A  |   | 6/1991  | Ahmed ........................ 375/106    |
| 5,027,351 | A  |   | 6/1991  | De Prycker et al. ........... 370/94      |
| 5,255,291 | A  | * | 10/1993 | Holden et al. ................ 375/362    |
| 5,327,581 | A  | * | 7/1994  | Goldberg ..................... 455/503    |
| 5,396,492 | A  |   | 3/1995  | Lien ............................ 370/60  |
| 5,566,180 | A  | * | 10/1996 | Eidson et al. ................ 370/473    |
| 5,602,992 | A  | * | 2/1997  | Danneels ..................... 709/248    |
| 5,982,828 | A  | * | 11/1999 | Fujimori et al. ............. 375/356     |
| 6,005,869 | A  | * | 12/1999 | Sakai et al. .................. 370/452   |
| 6,236,623 | B1 | * | 5/2001  | Read et al. .................... 368/46   |
| 6,259,677 | B1 |   | 7/2001  | Jain ........................... 370/252  |
| 6,278,718 | B1 |   | 8/2001  | Eschholz .................... 370/503     |
| 6,377,640 | B2 | * | 4/2002  | Trans ......................... 375/354   |

(Continued)

*Primary Examiner*—Ayaz R Sheikh
*Assistant Examiner*—Andrew C Lee
(74) *Attorney, Agent, or Firm*—Miles & Stockbridge P.C.

(57) ABSTRACT

A system for transmitting a clock signal through a packet-based network is disclosed. The system comprises a first node configured to measure a clock frequency of the clock signal and calculate an accuracy indicator of the measured clock frequency; a second node configured to receive the clock frequency measurement and the accuracy indicator of the clock frequency measurement, and synthesize the clock signal therefrom; and a packet-based network for transmitting the measured clock frequency and accuracy indicator from the first node to the second node. A method of deriving a clock frequency by identifying packets with the shortest total transmission time is also disclosed.

20 Claims, 8 Drawing Sheets

U.S. PATENT DOCUMENTS

| | | | |
|---|---|---|---|
| 6,538,995 B1 | 3/2003 | Cox et al. | 370/232 |
| 6,577,648 B1 * | 6/2003 | Raisanen et al. | 370/503 |
| 6,621,832 B2 | 9/2003 | Staats | 370/503 |
| 6,633,590 B1 | 10/2003 | Garofalo et al. | 370/507 |
| 6,647,246 B1 * | 11/2003 | Lu | 455/67.11 |
| 6,658,025 B2 * | 12/2003 | Mauritz et al. | 370/507 |
| 6,769,029 B1 * | 7/2004 | Seki et al. | 709/232 |
| 6,880,097 B1 * | 4/2005 | Frouin et al. | 713/400 |
| 6,975,629 B2 * | 12/2005 | Welin | 370/392 |
| 7,043,651 B2 * | 5/2006 | Aweya et al. | 713/400 |
| 7,055,050 B2 * | 5/2006 | Domon | 713/400 |
| 7,058,729 B1 * | 6/2006 | Le Scolan et al. | 709/248 |
| 7,099,354 B2 * | 8/2006 | Keating | 370/519 |
| 2002/0176362 A1 * | 11/2002 | Yun et al. | 370/236 |
| 2003/0063625 A1 * | 4/2003 | Belk et al. | 370/503 |

* cited by examiner

SYSTEM AND METHOD FOR RATE AGILE ADAPTIVE CLOCKING IN A PACKET-BASED NETWORK

CROSS-REFERENCE TO RELATED APPLICATION

This application claims benefit to U.S. provisional patent application No. 60/416,925 filed Oct. 9, 2002, which is hereby incorporated by reference.

INTRODUCTION

Traditionally, Time Division Multiplex (TDM) networks have been one type of network used to send serial data between two or more remote locations. In a TDM network, multiple serial data streams are combined into a single aggregate signal and transported over a synchronous network. Each data stream is separated into many segments, and each segment is assigned a different time slot of the aggregate in a time scheme. TDM networks repeatedly transmit a fixed sequence of time slots over the aggregate transmission channel. At the receiving end of the network, the data streams are reassembled according to the timing scheme of the network. Synchronization of the timing scheme is a very significant factor in accurate data transport.

TDM network components, herein referred to as TDM nodes, are generally synchronized to a high accuracy clock reference or network clock. If the nodal clocks are not actually synchronized to the same network clock, or referenced back to the same clock source, they may each be synchronized to independent clock sources that are of sufficient accuracy so that the TDM nodal clocks may be considered synchronized. Nodal clocks using this synchronization technique are said to be "pleisiochronous". Nodal clocks are then available in each node for generating port clocks for individual user circuits.

Data Terminal Equipment (DTE) comprises remote circuits connected to a node of a communications network. DTE's joined by a TDM network may each have a user clock which typically operates synchronously to the nodal clock. This means that the clock used by the connecting equipment to send and receive data to and from the TDM network is based on a clock generated from the internal node clock. In effect, trickle down synchronization is achieved from the network clock to the nodal clock to the user clock. Since each node is generating clocks that are derived from the same reference clock or source, the rate at which data enters and exits the TDM network is the same at each end, and no errors occur from buffer over or underflow.

There are, however, DTEs that cannot accept a user clock synchronized by the nodal clocks. If the transmitting DTE's user clock is not synchronized to the nodal clock and/or the system clock, the receiving DTE's user clock needs to be synchronized to the transmitting DTE's user clock in order to prevent buffer over or underflow that occurs when the data rate entering and exiting the buffers is not the same.

Instead of being synchronized to a nodal clock, the receiving DTE's user clock must be synchronized to the transmitting DTE's user clock. These user clocks may be synchronized to a clock frequency that may be asynchronous to the network clock and/or nodal clocks. This requires special support on the part of the TDM nodes to transport the data to synchronize the user clocks. That is, data based on the transmitting DTE's user clock must be passed through the network. Support for synchronization between the transmitting clock and the receiving clock is referred to as "adaptive clocking", wherein the receiving DTE is configured to recover the transmitting DTE's user clock in order to retrieve the serial data out of the network with a low error rate. In this case, the TDM network is configured to transport the data asynchronously to the rest of its network-synchronized data and often requires additional bandwidth to do so.

A Phase Locked Loop (PLL) typically performs this clock recovery. Since data in a TDM network is transported in fixed time slots according to the network and nodal clocks, the receiving TDM node receives a stream of data at a constant rate. The asynchronous behavior between the network and user clocks is regular and uniform, making the task of recovering the user clock easy to support. Also, due to the generally regular and consistent arrival rate of data from the TDM network, there is a low error-rate given that there are few buffer overflow or underflow events. A constant stream of data is provided to the PLL circuit for retrieving the user clock at the receiving DTE.

A need has been demonstrated to transmit and receive serial data across a packet-based network. Clock recovery for adaptive clocking becomes much more difficult when the arrival rate of data at the receiving end is not constant, such as in an Internet Protocol (IP) network. An IP network is a packet-based network where data transmission does not depend on the synchronization of clocks. There are significant characteristics of IP networks that make clock recovery very difficult.

One obstacle to clock recovery in an IP network is that data pass through an IP network in a very different manner than in a TDM network. Unlike TDM networks, where there is bit- or byte-interleaving of data in regular time slots, IP networks transfer packets of data. A packet groups transmission data together forming a discrete package, which usually ranges between 32 bytes and 1500 bytes or more. At a receiving node of an IP network, data arrive in "bursts" according to packet size. For instance, a receiving end may receive a burst of 1200 bytes of data, followed by a delay, and then another burst of 1500 bytes of data. The irregular rate at which data are received makes it very difficult for a clock recovery device to derive and lock-on to a transmitting DTE user clock signal.

The irregular rate at which packets are received at a remote node also complicates clock recovery in an IP network. Packet arrival times at a receiving end are often quite variable. Congestion on the network and packet prioritization can cause some packets to be either delayed or dropped altogether from the network. As mentioned before, packets can be variable in size. For example, Ethernet imposes a maximum packet size of 1500 bytes. A maximum packet size of 1000 bytes is common on X.25 networks. These packets sizes are not absolute, and packet sizes can usually range from 32 bytes to 1500 bytes or more. With such a large swing between minimum and maximum packet sizes, packet jitter increases across the network. The design of IP networks permits packets to take varying routes between the nodes on the network, also increasing delay jitter. These factors greatly complicate the task of clock recovery by a receiving DTE.

To implement adaptive clocking on an IP network, information is gathered from the packets arriving from the IP network, and used to recreate a clock that is nominally the same as the one at the transmitting node.

The present invention provides an improved system and method for adaptive clocking in an IP network that allows the receiving node to synthesize a transmitting clock of any frequency.

BRIEF DESCRIPTION OF THE DRAWINGS

In the drawings, where like reference numbers refer to like elements throughout the several views.

DETAILED DESCRIPTION

Known methods of performing adaptive clocking in an IP network are typically limited to situations in which a receiving clock is first set to a known nominal rate that is near the frequency of the transmitting clock. Minor adjustments are made to the receiving clock according to information received over the network about the transmitting clock in order to synchronize the receiving clock to the transmitting clock. The transmitting clock information typically comprises delta type information, such as the difference between the transmitting clock frequency and the frequency of a highly reliable master clock. There are many limitations to these known methods. For example, these methods do not work in situations in which the nominal frequency of the transmitting clock is unknown. It would be beneficial to be able to perform adaptive clocking for any clock rate. Integration of the packet arrival times over very long periods of time would allow a clock recovery circuit to discern the average data rate of a stream of data packets and synthesize a clock that approximates the user's input clock. However, gathering data arrival information to calculate and synthesize an appropriate user clock can take an excessive amount of time.

The present invention provides a method and system of quickly synthesizing a transmitting DTE's clock at a remote node to allow for adaptive clocking in a packet-based network. The inventive method does not require prior knowledge of any nominal speed, as absolute, rather than differential, measurements are used to send the transmitting clock's speed over the network. The system of the present invention synthesizes the transmitting clock by incrementally converging on the desired frequency.

Figure 1:
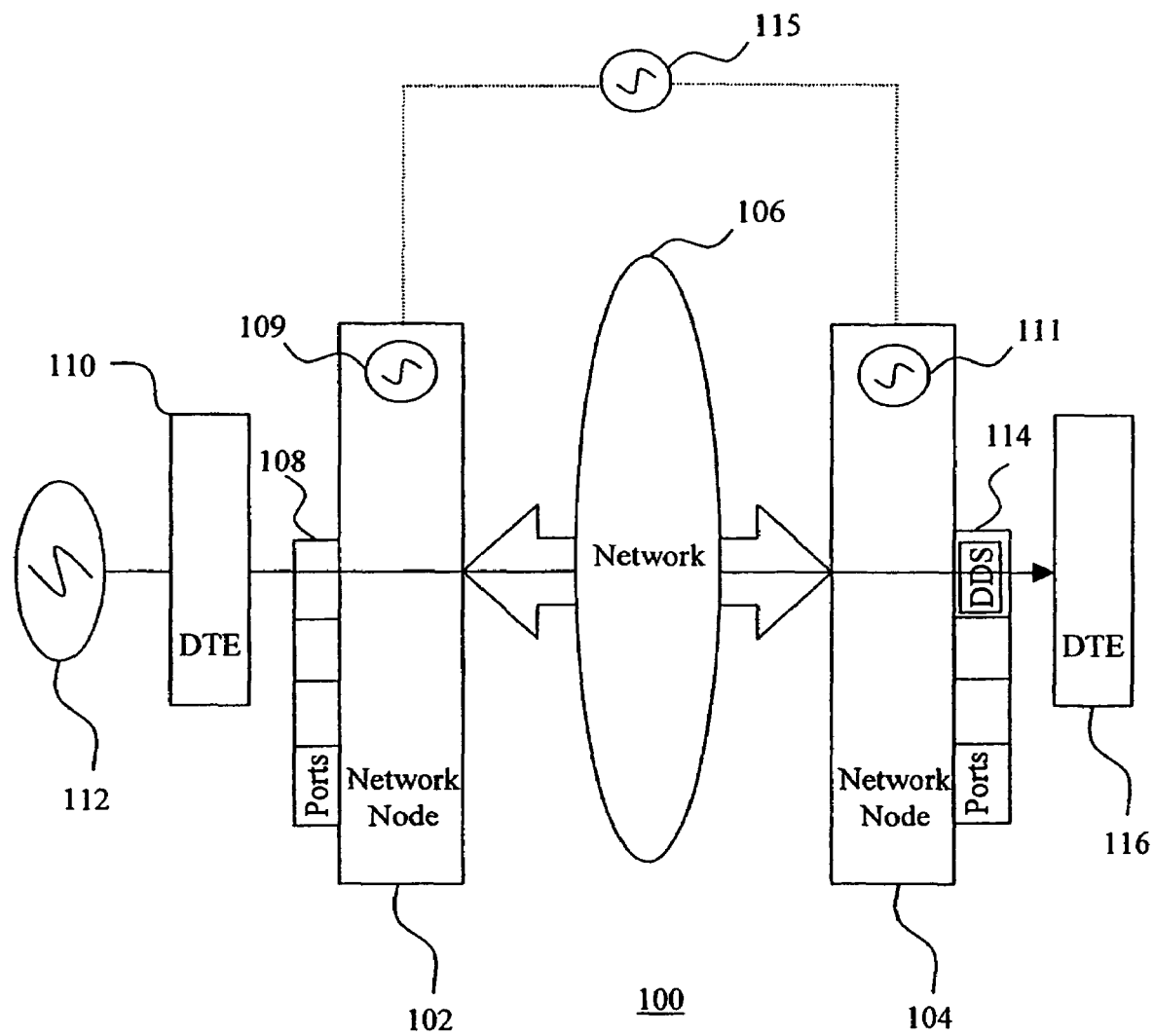
FIG. 1 is a block diagram of a system on an IP network that supports adaptive clocking in accordance with the present invention.

Referring now to FIG. 1, communication system 100 comprises a transmitting node 102, a receiving node 104, and a packet-based network 106 for communication there between. Nodes 102 and 104 may have nodal clocks 109, 111 respectively. Nodal clocks 109 and 111 may be synchronized to master clock 115.

Transmitting node 102 provides an ingress point for serial data passed through network 106. Node 102 is configured to receive a clock signal 112 and generate a plurality of clock frequency measurements thereon. Transmitting node 102 comprises measurement hardware for generating these frequency measurements with increasing accuracy. Node 102 transmits the clock frequency measurements across network 106 in accordance with network protocols.

Node 102 comprises at least one port 108 through which a transmitting DTE 110 is operatively connected. Transmitting DTE 110 supplies the serial data that is supported by clock signal 112 for transmission across network 106. Node 102 packages the serial data according to the protocols of packet-based network 106 for transmission. The serial data may be bit- or byte-synchronous data.

While the present embodiment shows the transmitting DTE 110 directly connected to transmitting node 102 via port 108, it should be appreciated that in alternative embodiments an intervening element may operatively bridge the connection between the transmitting DTE and the transmitting node. The intervening element may embody, for example, an encryption element for encrypting the serial data from the transmitting DTE for secure transmission across network 106.

It should further be appreciated that in alternative embodiments, the intervening element may be configured to receive a second clock signal, such as a black station clock signal.

Referring now to the present embodiment, receiving node 104 performs clock recovery at an egress point on network 106. Receiving node 104 is configured to receive the clock frequency measurements from network 106 and synthesize clock signal 112 therefrom.

Node 104 comprises at least one port 114 through which a receiving DTE 116 is operatively connected to receive clock signal 112. Node 104 includes signal synthesizing hardware. In the present embodiment, this includes a signal generator such as a Direct Digital Synthesizer (DDS) for synthesizing clock signal 112 using the frequency measurements from transmitting node 102. Receiving node 104 transmits synthesized clock signal 112 to receiving DTE 116. DTE 116 retrieves the serial data from node 104 according to the synchronization scheme of clock signal 112.

A hybrid approach to adaptive clocking is set forth herein comprising a first phase (Phase 1) and a second phase (Phase 2). Each phase is distributed across both nodes 102, 104. Phase 1 of the hybrid approach captures and recovers the signal of user clock 112. Phase 1 includes the steps of measuring, with increasing accuracy, the signal frequency of user clock 112 at transmitting node 102, transmitting the frequency measurements to receiving node 104, and recovering the signal of user clock 112 from the frequency measurements at receiving node 104. Phase 2 of the hybrid approach maintains the appropriate frequency of the recovered clock signal at receiving node 104. Phase 2 includes the steps of monitoring, at transmitting node 102, the signal frequency of user clock 112 for transitions, and adjusting the recovered signal with respect thereto at receiving node 104.

Figure 2:
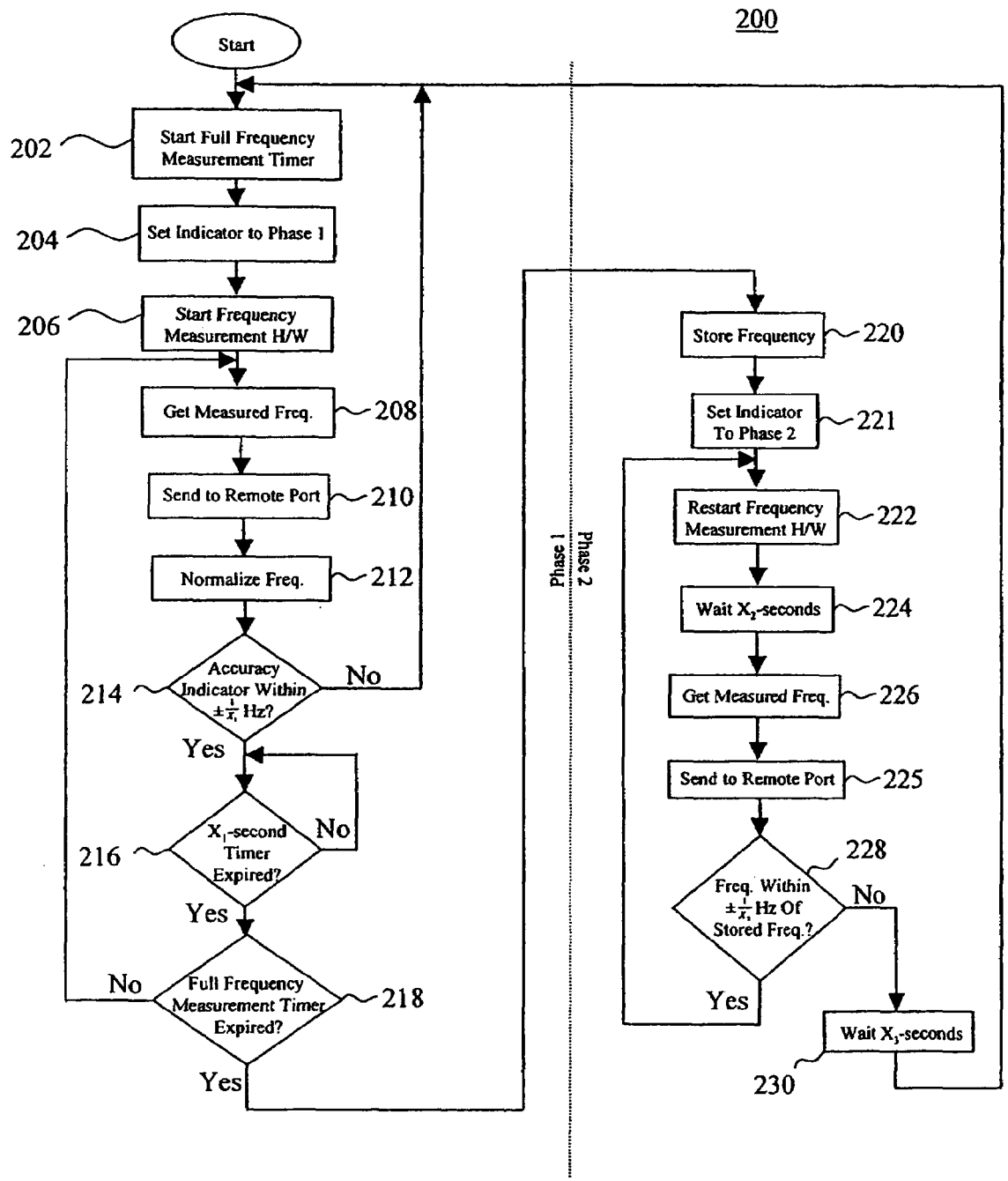
FIG. 2 is a flow chart showing the process for capturing the transmitting DTE's clock frequency.

FIG. 2 shows control flow of a measuring process 200 performed at transmitting node 102. The demarcation between Phase 1 steps and Phase 2 steps is shown.

Phase 1 begins at control block 202 by triggering a full frequency measurement time. This time is preferably a 128-second timer. It opens a 128 second window for capturing the frequency of user clock 112.

The full frequency measurement period of 128 seconds will provide a full frequency measurement having accuracy within $\frac{1}{128}$ Hz of the true signal frequency. It should be appreciated that alternative embodiments may increase or decrease the temporal period driven by the requirements of the system or synthesizing granularity of the DDS at the receiving node.

At control block 204, a phase 1 indicator is set that will be transmitted to receiving node 104 to trigger phase 1 therein. At control blocks 206-218, the frequency measurement hardware of transmitting node 102 captures the clock signal frequency of user clock 112 through a plurality of frequency measurements.

The frequency counter takes a full accurate measurement of its input clock once every full frequency measurement period, or 128 seconds. However, every half second (or other predetermined time period), an incremental measurement value is saved to a register, along with its relative accuracy. This allows the frequency counter to reveal the frequency of what it is measuring with steadily increasing accuracy until the full frequency measurement period is complete. Therefore, although the initial measurements from the counter are relatively inaccurate, they will quickly get progressively better as incremental measurements are made.

A full frequency measurement comprises a plurality of incremental frequency measurements taken at periodic intervals within the 128-second period. Each incremental frequency measurement is transmitted to receiving node 104 as will be described herein, each subsequent incremental measurement having greater accuracy with respect to the actual frequency of clock 112. The frequency measurement taken at the end of the 128-second period is the full accuracy frequency measurement having accuracy within $\pm\frac{1}{128}$ Hz, assuming the first incremental frequency measurement is within ±1 Hz.

In one embodiment, the measurement hardware comprises a counter for tallying clock edges that embody the frequency measurements. At control block 206, the measurement hardware is started to produce a frequency measurement of clock 112. The frequency measurement is retrieved from the counter (or other measurement hardware) at control block 208. The frequency measurement is tagged with the phase 1 indicator, and is transmitted to receiving node 104 at control block 210 in accordance with the protocols of packet-based network 106.

At control block 212, the current frequency measurement is normalized with respect to the first frequency measurement to obtain an accuracy indicator. The accuracy indicator suggests a relative accuracy measurement of the most recent frequency measurement. The accuracy indicator is sent to the receiving node with the frequency measurement. The frequency measurement and the accuracy indicator are used together by the receiving node to synthesize the transmitting clock at the receiving node. In one embodiment, the frequency measurement is the number of edges counted, and the accuracy indicator is the time period. The frequency measurement is multiplied by the accuracy indicator to synthesize the transmitting clock at the receiving node.

At decision block 214, the accuracy indicator is compared to a $\pm 1/X_1$ Hz threshold, wherein $X_1$ is the time interval between each partial accuracy frequency measurement taken. As will be apparent to those skilled in the art, other values could be used as the threshold. In the example given above, $X_1$ is one-half of a second. If the accuracy indicator is not within the $\pm 1/X_1$ Hz threshold, then the frequency of clock 112 has transitioned outside the initial tolerance limits and phase 1 is restarted at control block 202. If, at decision block 214, the accuracy indicator is within the $\pm 1/X_1$ Hz threshold, then a check is made at decision block 216 to determine if $X_1$ second(s) has expired since the last incremental frequency measurement was made. Decision block 216 loops back onto itself until $X_1$ second(s) has expired. It should be noted that if the measured frequency at control block 208 is the first sample, then there are no previous frequency samples so normalization is not performed. It is assumed the first partial measurement is within ±1 Hz of the actual frequency clock 112. In this case, control blocks 212 to 214 are bypassed.

Upon expiration of the $X_1$-second timer, an examination of the full frequency measurement timer (e.g. the 128-second timer) transpires at decision block 218. If the 128-second timer has not expired, incremental frequency measurements are continuously taken at every $X_1$ second(s) in accordance with blocks 208 to 216 for the remainder of the 128-second period. As stated, the accuracy of the incremental frequency measurements in the full 128-second period increases with each subsequent measurement, eventually converging upon the frequency measurement to within the full accuracy frequency measurement of $\pm\frac{1}{128}$ Hz.

If the 128-second timer has expired at decision block 218, then Phase 1 rolls over to Phase 2, which begins by storing the converged-upon measured frequency in a memory of node 102 at control block 220.

Phase 2 at transmitting node 102 accounts for any transitions or drifts in the frequency of user clock 112 once full accuracy is achieved in phase 1. At control block 221, a Phase 2 indicator is set that will be transmitted to receiving node 104 to trigger Phase 2 therein. At control block 222, the frequency measurement hardware of node 102 takes a frequency measurement of the clock signal frequency. After an $X_2$-second interval at control block 224, a frequency measurement is retrieved from the frequency measurement counter at control block 226. This frequency measurement is tagged with the Phase 2 indicator for transmission to receiving node 104 across network 106 at control block 225. At decision block 228, the frequency measurement is compared to the stored, full accuracy frequency measurement. If the frequency measurement is within a $\pm 1/X_2$ Hz limit of the stored frequency measurement, it is determined that no gross transition or drift has occurred, and Phase 2 continues to monitor user clock 112 by looping back to control block 222. If the frequency measurement is not within the limit, it may be concluded that user clock 112 has drifted outside the $\pm 1/X_2$ Hz tolerance limit indicating a gross transition or drift. To recapture the new frequency, Phase 1 is re-initiated at control block 230, wherein an $X_3$-second interval elapses to allow the frequency drift to settle before attempting to recapture the frequency in Phase 1.

It should be appreciated that the intervals of X1, X2, X3 may be identical or differing time durations, and may be designated by any unit of time.

During Phase 1 and Phase 2, transmitting node 102 packages serial data from DTE 110 into digital packets that are transmitted to receiving node 104.

Figure 3:
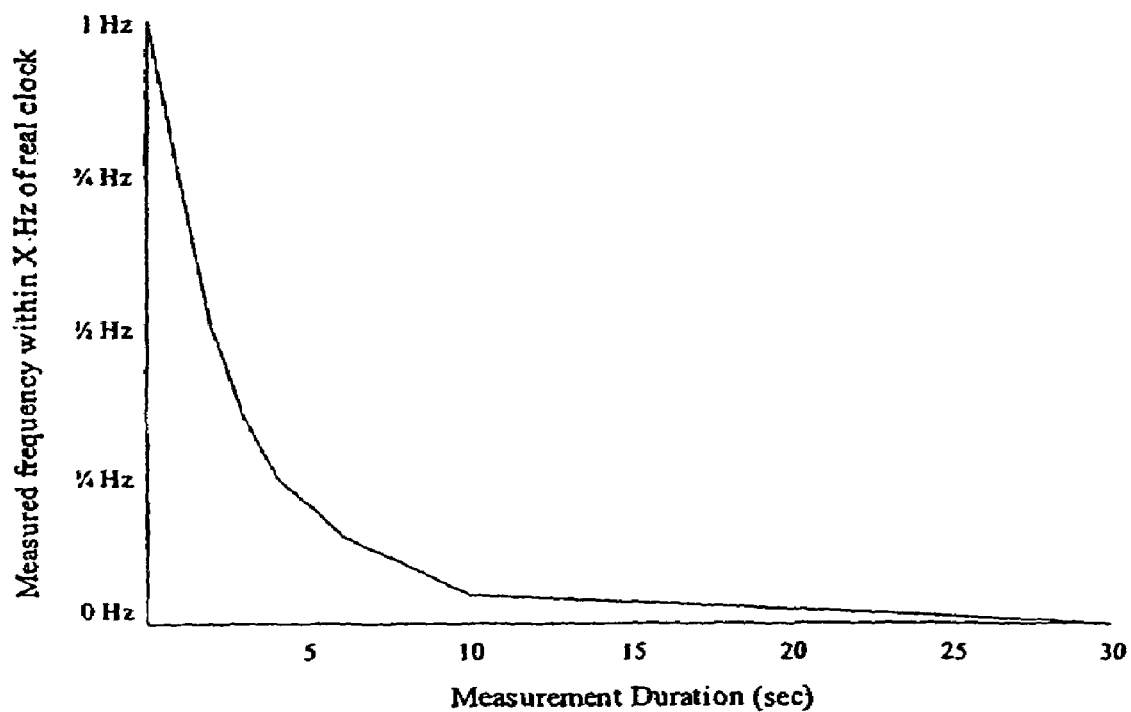
FIG. 3 is a graph indicating the measurement accuracy of the transmitting DTE's captured clock frequency as a function of time.

FIG. 3 is a graph showing the changing accuracy indicators of frequency measurements as a function of time. In this example, clock measurements are made at 1-second intervals for the 128-second period. Starting with a clock frequency measurement within 1 Hz of the actual clock frequency, the frequency measurements quickly converge on the actual frequency—at 1-second, the accuracy indicator is within ±1 Hz;

at 2-seconds, the accuracy indicator is within ±½ Hz; at 3-seconds, the accuracy indicator is within ±⅓ Hz; etc. At the termination of the 128-second period, the frequency measurement is to full accuracy within ±1/128 Hz. The full accuracy frequency measurement is transmitted across network 106 to transmitting node 104.

Using an example, accuracy to within ±1/128 Hz at 1.024 MHz corresponds to 8 ppb (parts per billion). Comparing this accuracy to that of known standards, 1.024 MHz clocks running at Stratum 3 accuracy translates to 7 Hz or 7 ppm (parts per million). In this example, the present invention improves accuracy in clock frequency by three orders of magnitude.

Figure 4:
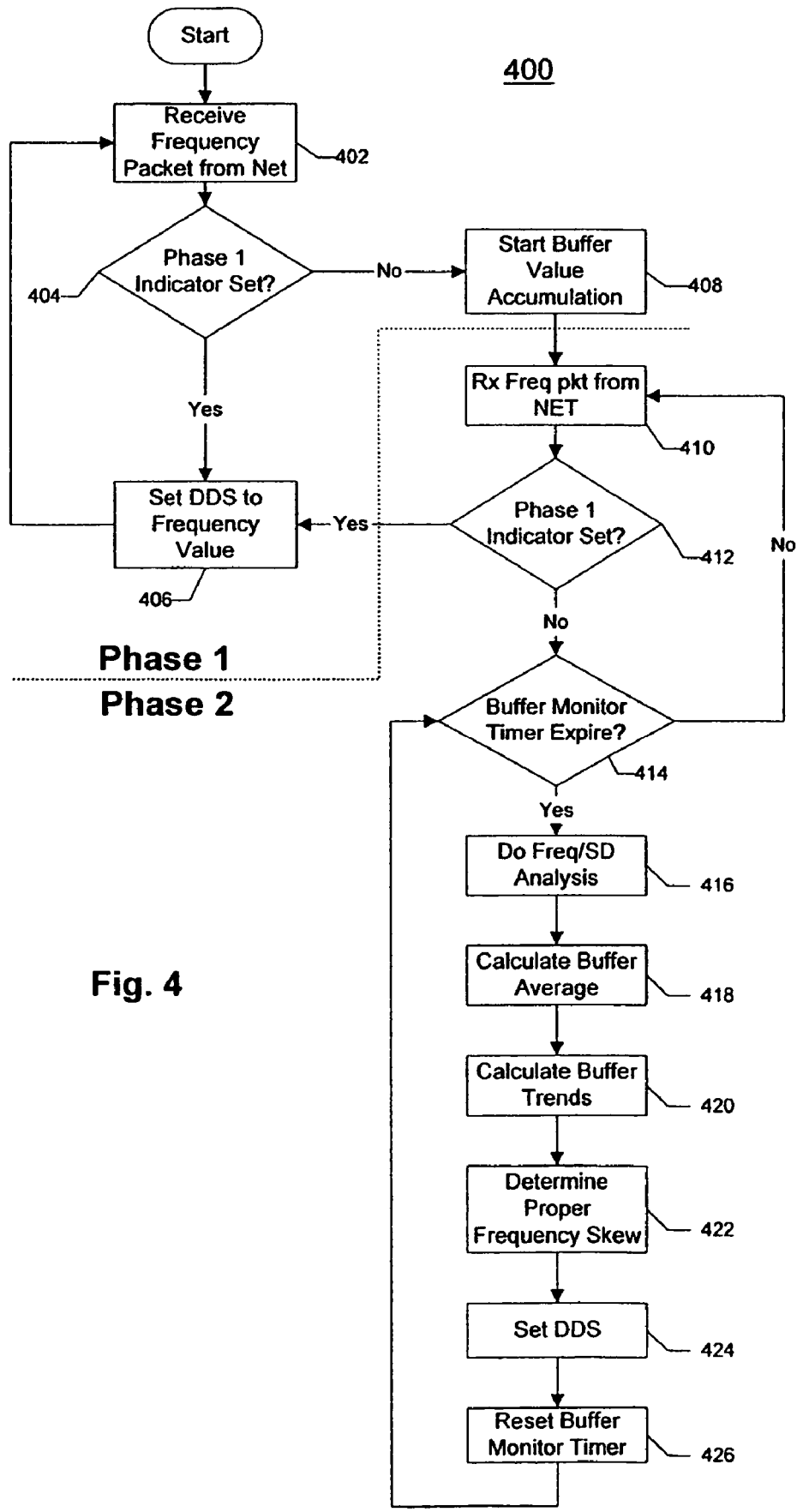
FIG. 4 is a flow chart showing the process for recovering the clock signal at a receiving node.

FIG. 4 shows control flow of a recovery process 400 performed at receiving node 104. The demarcation between Phase 1 steps and Phase 2 steps is shown. Phase 1 begins at control block 402, when receiving node 104 pulls a digital packet containing a frequency measurement and a phase indicator from network 106. At decision block 404, node 104 checks for a Phase 1 indicator and if one is found, the synthesizing hardware at control block 406 is set to generate a comparable frequency. In this manner, the frequency of clock 112 is recovered to the latest incremental measurement of increasing accuracy. In accordance with the plurality of incremental frequency measurements of Phase 1 taken during the 128-second period at node 102, control block 406 will continue looping back to control block 402, thereby accounting for each of the incremental frequency measurements to the full accuracy within ±1/128 Hz.

The generating hardware preferably has sufficient granularity in its frequency output to generate a clock signal to within ±1/128 Hz accuracy. A DDS is capable of generating frequencies with this granularity may be used. While a DDS is not required, it is important that the clock generator be able to synthesize frequencies with sufficient granularity to take advantage of the increasingly accurate measurements.

If a frequency measurement tagged with a Phase 2 indicator is received at receiving node 104 at decision block 404, serial data packaged into digital packets accumulate in a buffer maintained by receiving node 104.

In addition, as will be apparent to one skilled in the art, buffer fill measurements may begin accumulating sometime before Phase 2 actually starts. For example, packets may begin accumulating in the buffer during Phase 1. These measurements may or may not be used until Phase 2.

As buffer fill measurements begin to accumulate at block 408, process 400 shifts from Phase 1 to Phase 2 at receiving node 104. The buffer analysis may indicate the presence of free-running clock signals at nodes 102, 104, as will be discussed herein. In Phase 2, standard packet arrival monitoring mechanisms are used to "fine-tune" the frequency to maintain an average buffer fill to prevent errors on the circuit. Since the network infrastructure is packet-based, many different components of jitter will be introduced on the circuit data due to congestion, queuing, time of day, etc. These must be averaged and filtered out over long periods of time. Since recovered end clock circuit is within 1/128 HZ of the correct frequency, in Phase 2, data can be gathered and analyzed to determine if buffer fill trends indicate adjustments to the recovered frequency are needed.

At control block 410, node 104 pulls a digital packet containing a frequency measurement and phase indicator from network 106. At decision block 412, node 104 checks for a Phase 1 indicator, and if one is found, Phase 1 restarts by setting the current operating frequency at control block 406 in accordance with the frequency measurement of the most recently received digital packet. Alternatively, if a Phase 2 indicator is contained in the packet, then Phase 2 continues at decision block 414.

FIG. 4 illustrates one embodiment of processing Phase 2 at the receiving node that uses buffer average monitoring. Alternative embodiments are discussed below.

In the embodiment shown in FIG. 4, the mechanism for adaptive clocking in an IP network is to monitor the level of the buffer that receives data from the network. In a simple feedback control mechanism, the clock would adjust to pull data from the Rx buffer to maintain a constant buffer level. If the rate at which data arrives from the network increases, the buffer will begin to fill up. To compensate, the clock pulling data from the buffer must be increased to bring the buffer level back to normal. Similarly, if the data rate from the network decreases, the buffer will start to deplete, and the clock must be decreased.

At decision block 414 of FIG. 4, a user-specified buffer monitor timer is checked for expiration. The timer duration designates the time window for accumulating buffer samples in the buffer before trend analysis is performed. If the buffer timer has not yet expired, then there may not be enough data in the buffer to perform trend analysis. Remote port 114 may continue receiving the most recent frequency measurements at control block 410 as the buffer continues to accumulate more data. Alternatively, if the buffer monitoring timer has expired, the accumulated buffer samples undergo processing at control blocks 416 to 426.

At control block 416, an analysis is performed on the accumulated buffer samples to determine the components of variation in data packet arrival time to port 120 through network 106. Among the components of variation are frequency, magnitude, standard deviation, and averaging. A variety of techniques may be used to find these components, including the Fast Fourier Transform (FFT), which is a simple numerical method for determining the frequency components present in sampled digital data.

Upon completion of the sampled data analysis, the average buffer depth and buffer trends are calculated at control blocks 418 and 420, respectively, using a buffer monitoring and analysis tool. Preferably, the buffer tool has short-term and long-term monitoring and analysis capabilities for the reasons described below.

It should be appreciated that as stated earlier, node clocks 109, 111 on nodes 102 and 104 respectively, are preferably referenced to an accurate clock source 115 so that their frequencies are synchronized. This supports Phase 1 of the adaptive clocking process, so that the measured frequency value at local port 108 is the same as the recovered frequency at remote port 114, and the only difference between user clock 112 and the recovered frequency is the accuracy of the clock measurement. However, when node clocks 109, 111 are not referenced to the same clock source, they are considered to be "free-running". In this case, the recovered frequency will differ from user clock 112 not only by the accuracy of the measurement, but also by the magnitude of the difference in node clocks 109, 111.

This frequency difference between node clocks 109, 111 may be as much as 100 ppm (parts per million). If we take the example of a 1.024 MHz circuit, this is a frequency difference of 100 Hz. So, at the end of Phase 1 on frequency locked nodes, the recovered frequency is within 1/128 Hz of user clock 112. However, if these same node clocks 109, 111 are free-running and differ by 100 ppm, the recovered frequency at remote port 114 will differ by 100 Hz. This means that the Phase 2 portion of the process should be capable of discerning this frequency difference quickly in order to adapt before buffer over or under flow occurs. This may be achieved by the Phase 2 buffer monitoring process having short- and long-term average results. If the short term result indicates that the buffer level is not changing rapidly, it may be assumed that the node clocks are locked and the long term buffer monitoring performed during Phase 2 is sufficient to converge on an acceptable recovered user clock. If, however, the short term results indicate that the buffer level is changing quickly, the average buffer fill rate will be calculated so that the recovered clock synthesizer rate can be adjusted to maintain a constant buffer fill. Over time, the proper recovered frequency may then be realized. Once the frequency difference between the nodes has been determined, the background gross frequency monitoring process (Phase 1) should be adjusted to compensate for the difference.

This is shown in steps 416-424 of FIG. 4. If, upon analysis, the short-term results indicate that the buffer depth is not changing rapidly, it will be assumed that node clocks 109, 111 are synchronized and that the long-term buffer monitoring process will suffice to converge on an acceptable clock.

If at control block 422 the short-term results indicate that the average buffer depth is changing too quickly, the buffer tool will calculate the average buffer fill rate and adjust the recovery clock generator at control block 424 in order to maintain a constant buffer fill. The buffer monitor timer is then reset at control block 426, which then loops control back to control block 414 for continuous monitoring until a Phase 1 transition event is encountered at decision block 412.

In another embodiment of the present invention, an improved method of adaptive clocking that filters the variable packet delay from the received data to extract the transmitting clock frequency.

Figure 5:
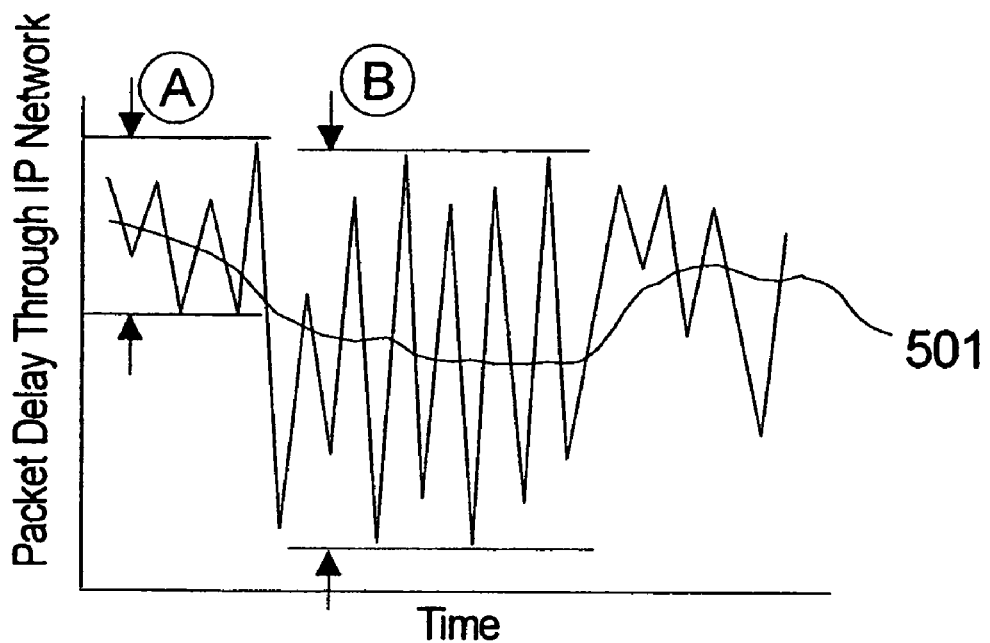
FIG. 5 is a graph showing an example of variations in packet delay in an IP network.

FIG. 5 illustrates a possible behavior scenario for an IP network. FIG. 5 shows many variations in packet delay for the data being transmitted through an IP network. For an initial time period (A), the packet delay variation is relatively small. However, at a later time, the packet delay variation increases (B). If the above method of buffer averaging is used, the result might be something like line 501. If the variation in this average value is many milliseconds, the resulting clock variations will be unacceptable.

Figure 6:
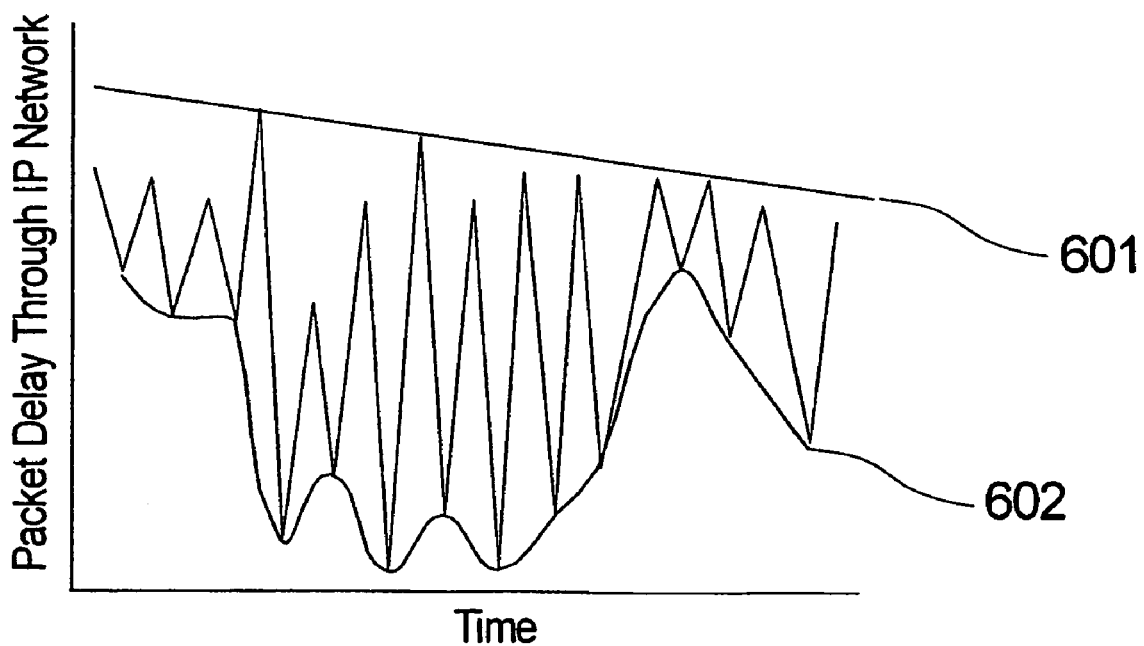
FIG. 6 is a graph showing variations in a transmitting clock and packet delay variation in an IP network.

FIG. 6 illustrates variations in the transmitting clock and packet delay of the IP network. The points in the graph represent the variability in delay that a packet may experience when it travels through an IP network. As shown, some packets take longer than others. Those packets that take longer are usually delayed by being queued behind other packets in the IP routers. There are some packets, however, which are "lucky", and manage to traverse the network with a minimum of delay. It is reasonable to assume that there are a percentage of these packets that will occur statistically during a given period of time. If these are the only packets that are used to determine the trends in buffer fill (and subsequently clocking), a much more accurate evaluation can be made.

As shown in FIG. 6, line 601 represents the clock inserting data into the network, while the curve 602 is the network delay. By averaging all of the data in the graph, both elements are incorporated, as shown in FIG. 5. But if only the "lucky packet" line 601 is used, the packet delay variation is effectively filtered out, leaving the transmitting clock synchronizing information. Essentially, if there is no delay due to the IP network, the arrival rate of the "lucky" packets mimics the transmitting clock signal.

The method of this embodiment separates the clock variation from the IP network packet delay variation and filters out the packet delay variation. The extracted clocking information is used to derive a clock to maintain buffer fill.

The data used are measurements that represent the current buffer fill value. These are actually timer measurements. A timer is started when a packet arrives from the network and is placed in the Rx buffer. The timer is stopped when that same packet is pulled from the buffer to be sent to the receiving DTE. The time value is then stored. When a new packet arrives from the network, another timer measurement starts. This process continues indefinitely.

To find a "lucky packet", in one embodiment a fixed number of measurements are grouped, and then the "luckiest" three packets are located in this group. Obviously, fewer or more than three packets could be used.

Figure 7:
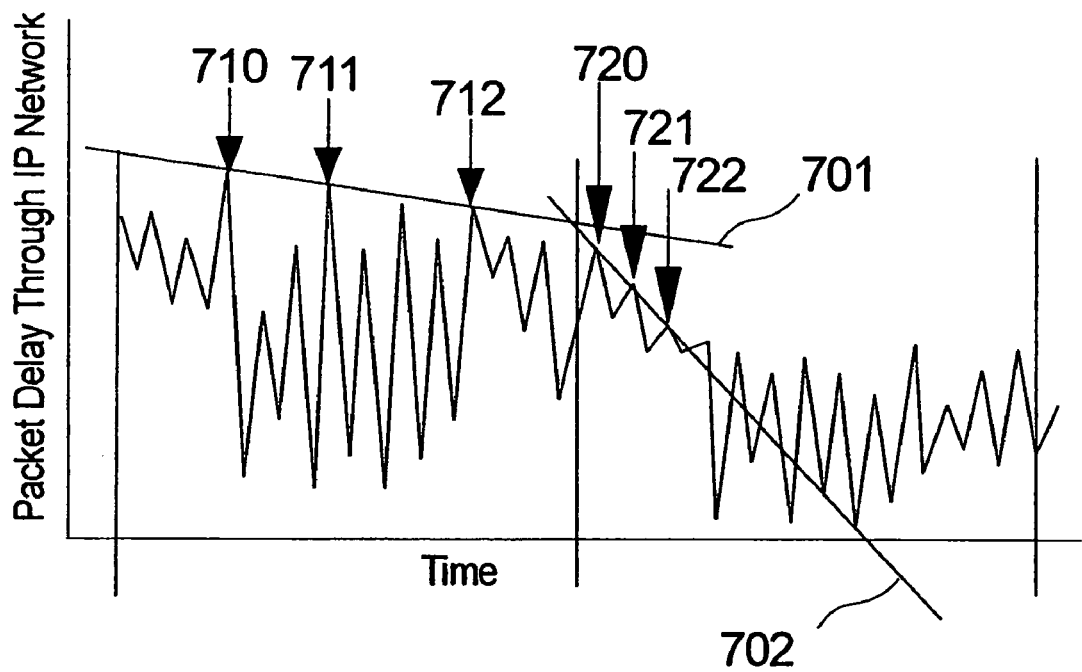
FIG. 7 is a graph showing clock variation determined through lucky packet identification.

These three measurements represent the points on which the lucky packet line will "rest" in a graph. A slope is calculated from these points to represent the line. FIG. 7 illustrates this concept.

As shown in FIG. 7, during a first period of time, points 710, 711 and 712 are determined to the be the luckiest packets. These are the packets that stayed in the buffer the longest amount of time during the first period. The slope of line 701 is calculated from points 710, 711 and 712. However, in the second period, the three luckiest packets 720, 721, and 722 occurred within a short period of time. Therefore, calculated line 702 is representative of the trend in that period, and is not a good approximation of the transmitting clock.

Figure 8:
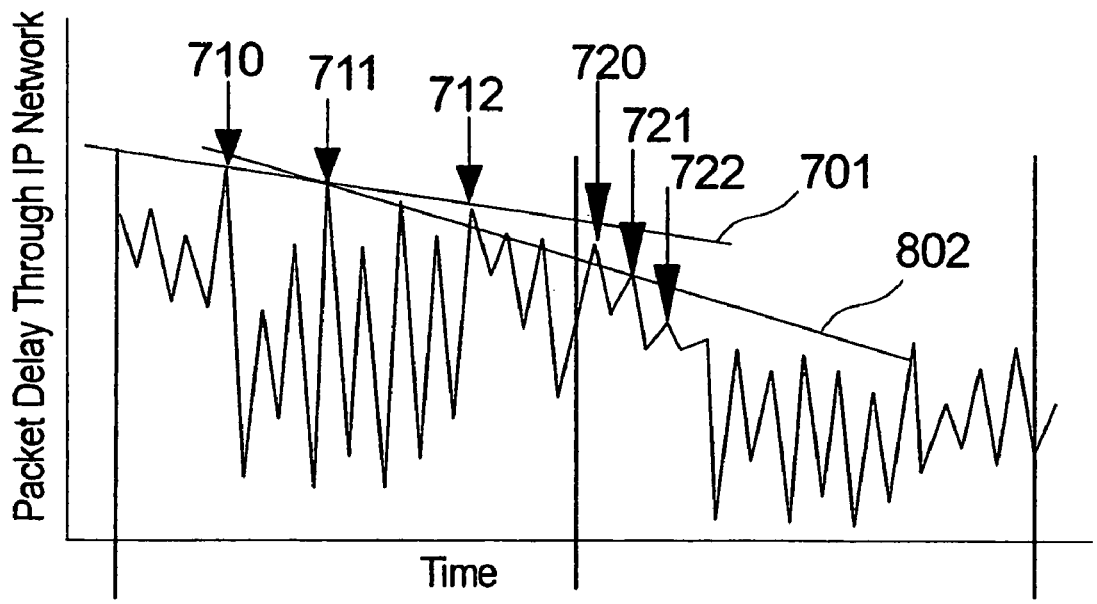
FIG. 8 is a graph showing clock variation determined through continuous lucky packet identification.

As shown in FIG. 8, in a preferred embodiment, a "lever" is applied to the line by incorporating the "luckiest" packet in the previous time period, 710. By using packet 710 as a "handle", the line 802 shows a more accurate trend analysis of the data.

The slope represents the direction and magnitude of the clock difference between the transmitting and receiving nodes of the network. If the slope of the line is positive, the buffer values are increasing, which means that data is staying in the buffer progressively longer. If the data is in the buffer longer, the clock pulling data from the buffer is too slow and needs to be sped up. The slope represents the magnitude of the needed clock adjustment. Likewise, if the slope is negative, the clock is too fast. When the slope is zero, the clocks are synchronous.

Figure 9:
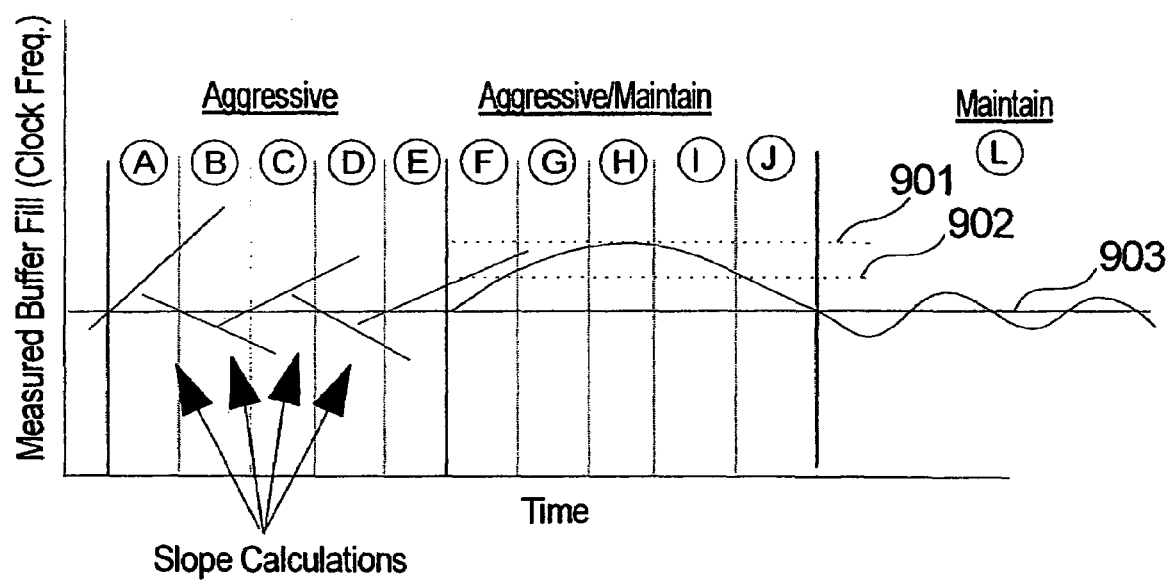
FIG. 9 is a graph illustrating three stages in the multistage adaptive clocking process of the present invention.

One embodiment of the adaptive clocking method of the present invention is a multistage process that uses the slope calculations to make adjustments. In a preferred embodiment, four stages may be used. FIG. 9 illustrates the first three stages.

The first stage may be termed "Aggressive." The purpose of this stage is to quickly make a slope determination and clock adjustment to try to avert an imminent buffer over or underflow. It is possible that the clocks are significantly off frequency from one another at each end of the network. For example, the clock may be 100 ppm out of sync. With this magnitude of difference, the Rx buffer is in imminent danger of under or overflow. Therefore, relatively rapid coarse adjustments must be made to the clock to at least slow down the rate at which the buffer is moving towards empty or full. During each of the sample groups (A-E) a slope is calculated and a clock adjustment made. The adjustment to the clock is intended to result in a slope calculation of 0 in the next period. The example shown in FIG. 7 illustrates overcompensation in the clock adjustment, since the slope is alternating from positive to negative slope. Success is achieved in this first stage when the calculated slope falls below a specified threshold. In the example shown in FIG. 7, this occurs during period E. The process then moves to the "Aggressive/Maintain" stage.

When the process moves to the "Aggressive/Maintain" stage, the current buffer fill value (extrapolated from the luckiest packet of the most recent group with the calculated slope) is saved and recorded as the "goal" buffer fill. From this point forward, all clock adjustments will be made in an attempt to drive the fill of the buffer to this recorded value. Every group will therefore now include a buffer error, which is the difference between the current buffer fill and the "goal" buffer fill, as well as a slope calculation. In the "Aggressive/Maintain" stage, attempts to drive the error to 0 in a minimum amount of time are made. The slope value at the beginning of the "Aggressive/Maintain" stage depend on the threshold value set for transition from the previous stage. If the threshold is very small, the clock is already close to the proper frequency and the "Aggressive/Maintain" stage may be quite short. However, setting the threshold to a very small value may cause the adaptive clock state machine to stay in the "Aggressive" state for a very long period of time if the IP network delay variation is high. Therefore, the threshold slope is preferably set to a larger value, in order to exit the "Aggressive" stage as soon as possible.

During periods F through J, slope and error calculations and clock adjustments are made in an attempt to reduce the error to 0. The slope is used to adjust the clock to the correct frequency, while the error value is used to make a clock adjustment to reduce the error value. A combination of these two values yields a clock adjustment that should eventually converge on the recorded buffer fill set point.

In the "Aggressive" stage, there is no limitation on the clock adjustment. In the "Aggressive/Maintain" stage, there is preferably a configurable cap on the adjustments that can be made on the clock per group period. This cap may have the effect of dampening clock adjustments. However, when near the target frequency and buffer level, smaller adjustments to the clock are better than large ones since there will be a tendency to "smooth the bumps" in frequency adjustments.

It is desirable to exit the "Aggressive" stage as soon as possible as radical clock adjustments can be made during this stage, which may have adverse effects on user equipment.

When the transition is made between "Aggressive" and "Aggressive/Maintain" states, another threshold value is preferably set. This threshold determines when to go back to the "Aggressive" state when the buffer error value has gotten too large. If the "Aggressive/Maintain" state is entered with a relatively small slope, the clock frequency is close to correct and not many adjustments will be needed to bring the slope to 0. However, tif the slope is larger as it enters the "Aggressive/Maintain" state, more work will be needed to bring the slope to 0.

FIG. 9 illustrates this concept. Lines 901 and 902 represent potential thresholds for the maximum buffer error. If line 902 is used, at group G, the state would be set back to Aggressive. However, if 901 is used, the process will remain in the "Aggressive/Maintain" state until the error is brought to 0 by the end of group J. It is preferably to configure the parameters for adaptive clocking such that transitions from "Aggressive/Maintain" back to "Aggressive" are rare.

In the "Aggressive/Maintain" state, the process will find and record the time at which the slope becomes zero. When the slope is zero, the clock is at the correct frequency. However, it is also desirable to achieve zero buffer error. In the "Aggressive/Maintain" state, it is not likely that the buffer error is zero when the slope is zero. This situation is shown in Group H of FIG. 9. If the clock value at group H is recorded as a zero slope value, then used at group J, it is possible to quickly converge on both zero slope and zero buffer error.

After the buffer error is driven to zero in the "Aggressive/Maintain" stage, the process moves to the "Maintain" stage. Although the buffer error is zero, there may still be a non-zero slope. If this is the case, the buffer error will increase in the opposite direction and will need to be corrected in the "Maintain" stage. As shown in FIG. 9, the process will continue to oscillate the buffer fill around the zero error point, line 901. The zero error point is the correct buffer fill. Eventually, it will settle to the desired state of zero buffer error and zero slope.

With the use of a zero-slope clock value, large oscillations are eliminated completely. When the zero-slope clock value is used at the time when the buffer error is zero, no more convergence is needed. The mechanism driving the buffer error to zero is the same in both the "Aggressive/Maintain" stage and the "Maintain" stage. However, during the "Aggressive/Maintain" stage, larger clock adjustments are allowed to bring the slope to zero as quickly as possible. When the process moves to the "Maintain" stage, the slope and the buffer error are both zero, a much smaller clock adjustments can be used to gain the benefits of smoothing. Although the slope is still calculated and used to derive a clock adjustment value, it is expected to be close to zero and not play a significant role.

Figure 10:
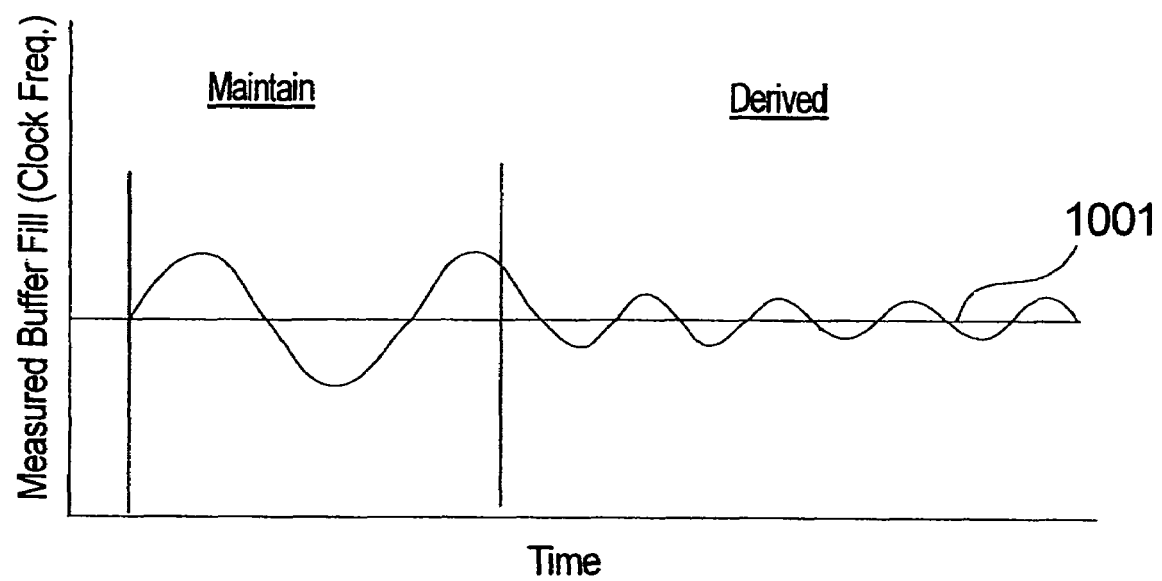
FIG. 10 is a graph illustrating Maintain and Derived stages in the multistage adaptive clocking process of the present invention.

As shown in FIGS. 9 and 10, the clock and buffer error will oscillate around the set buffer level indefinitely. If the group sizes are chosen appropriately, there will be enough "lucky packets" in each group to get a good buffer fill estimation independent of the IP network latency.

In the "Maintain" stage the buffer error will have a tendency to oscillate around the set buffer point, which correlates to oscillation of the clock around the "correct" frequency. If long-term averaging techniques are used to follow these oscillations over very long periods of time, a very accurate representation of the remote clock may be derived. This value, once found, may be stored in nonvolatile memory to be used as the starting point should an anomaly occur which would normally require a transition back to the "Aggressive" stage. Instead, the saved derived value can set the clock straight into the "Maintain" stage, assuming that the initial clock value is very close to correct.

As shown in FIG. 10, the fourth stage, the "Derived" stage, makes even smaller clock adjustments. This has a greater clock smoothing effect, and reduces the oscillations around the buffer set point.

It should be appreciated that this system architecture does not need to be configured to operate at a specific rate. This architecture is capable of pass-through timing on a circuit to any rate within the synthesis range of the clock recovery circuit, without the need to reconfigure the rate. When the frequency measurement circuit starts, it will measure the frequency of network bound user data, no matter what the frequency is. The accuracy result of 1/(measurement period) Hz is also independent of port rate. It should be appreciated that the 128-second measurement period may be adjusted to fit the needs of the system.

While this invention has been described in conjunction with specific embodiments thereof, the preferred embodiments of the invention as set forth herein, are intended to be illustrative, not limiting.

The invention claimed is:

1. A system for transmitting a first clock signal through a packet-based network comprising:
   a first node to take a plurality of clock frequency measurements of the first clock signal and to calculate corresponding accuracy indicators of the clock frequency measurements, each accuracy indicator being a time duration of measurement, and the clock frequency measurements being of increasing accuracy with respect to the first clock signal in a first phase of operation;
   a second node to receive the clock frequency measurements and corresponding accuracy indicators and to synthesize respective second clock signals based on the clock frequency measurements and corresponding accuracy indicators; and a packet-based network to transmit the clock frequency measurements and corresponding accuracy indicators from the first node to the second node, wherein, in the first phase of operation, the synthesis of the second clock signals involves incremental convergence of the second clock signals toward the first clock signal based on the received clock frequency measurements of increasing accuracy.

2. The system of claim 1, wherein the synthesis of the second clock signals includes multiplying the clock frequency measurements by the corresponding accuracy indicators.

3. The system of claim 1,
wherein the second node receives one of a first indicator and a second indicator with each frequency measurement, the first indicator representing the first phase of operation for the second node, and the second indicator representing a second phase of operation for the second node, and
wherein, in the second phase of operation, a frequency of the synthesized second clock signals is maintained.

4. The system of claim 1, further comprising an encryption element associated with the first node.

5. The system of claim 1, wherein the clock frequency measurements are absolute values.

6. A system for transmitting bit synchronous data through a packet-based network comprising:
a first node to receive the bit synchronous data for transmission through the packet-based network, the first node including measurement hardware to generate a plurality of clock frequency measurements based on a first clock signal received by the first node and a corresponding accuracy indicator for each of the clock frequency measurements, the clock frequency measurements and corresponding accuracy indicators to be transmitted through the packet-based network, and the clock frequency measurements being generated with increasing accuracy with respect to the first clock signal in a first phase of operation; and
a second node to receive the clock frequency measurements and corresponding accuracy indicators from the first node via the packet-based network, the second node including signal synthesizer hardware to synthesize respective second clock signals from the received clock frequency measurements and corresponding accuracy indicators to retrieve the bit synchronous data,
wherein, to generate the clock frequency measurements, the measurement hardware measures a number of counts during a predetermined period of time, and the accuracy indicator is a period of time for measuring the number of counts, and
wherein, in the first phase of operation, the synthesizer hardware substantially reproduces the first clock signal at the second node based on incremental convergence of the second clock signals based on the received clock frequency measurements of increasing accuracy.

7. The system of claim 6, wherein synthesis of the second clock signals includes multiplying the clock frequency measurements by corresponding accuracy indicators.

8. The system of claim 6,
wherein the second node receives a phase of operation indicator from the first node via the packet-based network, the phase of operation indicator being one of a first phase of operation indicator and a second phase of operation indicator, and
wherein the second phase of operation indicator indicates that an associated clock frequency measurement received by the second node from the first node is accurate to a predetermined threshold.

9. The system of claim 6, further comprising an encryption element associated with the first node.

10. The system of claim 6, wherein the clock frequency measurements are absolute values.

11. A method for adaptive clocking in a packet-based network between a first node and a second node, the method comprising:
receiving a first clock signal for transmission through the packet-based network at the first node;
repeatedly measuring, in a first phase, the first clock signal to obtain a plurality of frequency measurements of increasing accuracy at the first node;
determining a corresponding accuracy indicator for each frequency measurement at the first node, the accuracy indicator being a time duration of measurement;
individually transmitting each frequency measurement with its corresponding accuracy indicator through the packet-based network from the first node to the second node;
receiving each frequency measurement and corresponding accuracy indicator at the second node;
deriving, in the first phase, respective second clock signal signals from the frequency measurements and corresponding accuracy indicators at the second node, to represent the first clock signal based on incremental converging of the second clock signals based on the received clock frequency measurements of increasing accuracy; and
transmitting the derived second clock signals signal from the second node to user equipment connected to the second node.

12. The method of claim 11,
wherein said individually transmitting further includes transmitting a phase indicator through the packet-based network from the first node to the second node,
wherein the phase indicator is one of a first phase indicator and a second phase indicator,
wherein the first phase indicator indicates capturing and recovering of the first clock signal, and
wherein the second phase indicator indicates maintaining the first clock signal.

13. The method of claim 11, wherein the clock frequency measurements are absolute values.

14. In a packet-based network with a first transmitting node and a second receiving node, a method of determining a frequency of a transmitting clock at the second receiving node, said method comprising:
receiving a first plurality of packets;
determining a total time of transmission for each packet;
identifying, from the first plurality of received packets, a first predetermined number of packets that have the first predetermined number of shortest total transmission times of the total transmission times of the plurality of received packets, the first predetermined number of packets identified being greater than one; and
deriving the frequency of the transmitting clock by use of the identified first predetermined number of packets having the first predetermined number of shortest total transmission times.

15. The method of claim 14, wherein the derived frequency is used to maintain buffer fill at the second receiving node.

16. The method of claim 14, additionally comprising:
identifying the packet of the first predetermined number of packets having the shortest total transmission time;
receiving a second plurality of packets;
determining a total time of transmission for each packet in the second plurality of packets;
identifying, from the second plurality of received packets, a second predetermined number of packets that have the shortest total transmission times; and
deriving the frequency of the transmitting clock based on the identified second predetermined number of packets and the identified packet with the shortest total transmission time in the first plurality of packets.

17. The method of claim 14, wherein the identified first predetermined number of packets is three.

18. The method of claim 16,
wherein the identified first predetermined number of packets identified is three, and
wherein the identified second predetermined number of packets identified is three.

19. The method of claim 14, wherein the frequency of the transmitting clock is derived based on incremental convergence of increasing accuracy.

20. The method of claim 14, further comprising encrypting, at the first transmitting node, and decrypting, at the second receiving node.

* * * * *